United States Patent
Yasuda

(10) Patent No.: US 7,123,759 B1
(45) Date of Patent: Oct. 17, 2006

(54) IMAGE TRANSFER AND OUTPUT METHOD AND SYSTEM USING THE SAME

(75) Inventor: Hiroaki Yasuda, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 537 days.

(21) Appl. No.: 09/607,921

(22) Filed: Jun. 30, 2000

(30) Foreign Application Priority Data

Jun. 30, 1999 (JP) ................................. 11-185350

(51) Int. Cl.
*G06K 9/00* (2006.01)
(52) U.S. Cl. ..................................................... 382/130
(58) Field of Classification Search ......... 382/128–134
See application file for complete search history.

(56) References Cited

U.S. PATENT DOCUMENTS

| | | | | |
|---|---|---|---|---|
| 4,346,295 A | | 8/1982 | Tanaka et al. ............ 250/327.2 |
| 4,683,377 A | * | 7/1987 | Hishinuma et al. ......... 250/582 |
| 4,855,598 A | | 8/1989 | Ohgoda et al. ........... 250/327.2 |
| 4,896,037 A | | 1/1990 | Shimura et al. .......... 250/327.2 |
| 5,164,993 A | * | 11/1992 | Capozzi et al. ............. 382/132 |
| 5,233,989 A | * | 8/1993 | Honda ......................... 600/425 |
| 5,283,736 A | * | 2/1994 | Nagatsuka et al. ......... 382/131 |
| 5,289,374 A | * | 2/1994 | Doi et al. .................... 600/407 |
| 5,291,403 A | * | 3/1994 | Ito .............................. 250/587 |
| 5,343,390 A | * | 8/1994 | Doi et al. ................... 382/132 |
| 5,535,289 A | * | 7/1996 | Ito .............................. 382/130 |
| 5,754,676 A | * | 5/1998 | Komiya et al. ............. 382/132 |
| 5,901,240 A | * | 5/1999 | Luo et al. ................... 382/132 |
| 5,982,953 A | * | 11/1999 | Yanagita et al. ............ 382/294 |
| 6,016,356 A | * | 1/2000 | Ito et al. ..................... 382/132 |
| 6,094,218 A | * | 7/2000 | Suzuki et al. ................ 348/96 |
| 6,278,760 B1 | * | 8/2001 | Ogawa et al. ................. 378/5 |

FOREIGN PATENT DOCUMENTS

| | | |
|---|---|---|
| EP | 000677780 A2 * | 10/1995 |
| JP | 7-319092 | 12/1995 |
| JP | 8-116435 | 5/1996 |
| JP | 08-336517 * | 12/1996 |

OTHER PUBLICATIONS

English language abstract 08-116435 May 7, 1996.

* cited by examiner

*Primary Examiner*—Jingge Wu
*Assistant Examiner*—Tom Y. Lu
(74) *Attorney, Agent, or Firm*—Sughrue Mion, PLLC

(57) ABSTRACT

A plurality of original image signals representing radiation image information, which have been fed out from an image signal input apparatus, are fed into an operation processing device. Predetermined operation processing is performed on the plurality of the received original image signals in the operation processing device to obtain an operation-processed image signal. Also, at least one original image signal, which is among the plurality of the original image signals, is transferred to an image output device. Image outputting is performed with the image output device and in accordance with the one original image signal having been transferred. After the operation-processed image signal has been obtained from the predetermined operation processing, the operation-processed image signal is fed into the image output device, and image outputting is performed with the image output device and in accordance with the received operation-processed image signal.

11 Claims, 5 Drawing Sheets

IMAGE TRANSFER AND OUTPUT METHOD AND SYSTEM USING THE SAME

BACKGROUND OF THE INVENTION

1. Field of the Invention

This invention relates to an image transfer and output method and an image transfer and output system. This invention also relates to an image signal input terminal and an image output terminal for use in the image transfer and output system.

2. Description of the Related Art

In various fields, such as the medical field, techniques for reading out a radiation image of an object, which has been recorded on a stimulable phosphor sheet or film, to obtain an image signal, performing predetermined image processing on the image signal, and thereafter displaying a visible image, which is reproduced from the processed image signal, on an image display device, such as a cathode ray tube (CRT) display device, or outputting the visible image on film with a printer, such as a laser printer (LP), have heretofore been utilized.

Particularly, recently, digital image processing techniques utilizing computers have been developed. Also, various image forming apparatuses (image forming modalities) utilizing the digital image processing techniques have been used in practice as the apparatuses for forming images for use in making a diagnosis, and the like. As such image forming modalities, computed tomography (CT) scanners, magnetic resonance imaging (MRI) apparatuses, computed radiography (CR) apparatuses, and the like, have been used in practice. The reproduced visible image is utilized for making a diagnosis, e.g. for investigating the presence or absence of a diseased part or an injury or for ascertaining the characteristics of the diseased part or the injury.

The CR apparatuses are radiation image recording and read-out apparatuses. With the radiation image recording and read-out apparatuses, a radiation image of an object, such as a human body, is recorded on a sheet provided with a layer of a stimulable phosphor (hereinafter referred to as a stimulable phosphor sheet). The stimulable phosphor sheet, on which the radiation image has been stored, is then exposed to stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal with photoelectric read-out means, such as a photomultiplier. Recently, the CR apparatuses are widely used in practice.

As techniques for photoelectrically detecting light emitted by a stimulable phosphor sheet, the applicant proposed techniques for detecting light emitted from opposite surfaces of a stimulable phosphor sheet and thereby detecting two image signals from the opposite surfaces of the stimulable phosphor sheet in, for example, U.S. Pat. No. 4,346,295 and Japanese Unexamined Patent Publication No. 8(1996)-116435. With the proposed techniques, two photoelectric read-out means are located respectively on opposite surface sides of the stimulable phosphor sheet. Also, stimulating rays are irradiated to the two surfaces or only to one surface of the stimulable phosphor sheet, and the light, which is emitted by the stimulable phosphor sheet when it is exposed to the stimulating rays, is photoelectrically detected on the opposite surface sides of the stimulable phosphor sheet.

Specifically, with the techniques for detecting light emitted from opposite surfaces of a stimulable phosphor sheet and thereby detecting two image signals from the opposite surfaces of the stimulable phosphor sheet, a stimulable phosphor sheet is formed by overlaying a stimulable phosphor layer on a surface of a transparent substrate, and a radiation image is stored on the stimulable phosphor sheet. The stimulable phosphor sheet, on which the radiation image has been stored, is fitted on a transparent holder, and two photoelectric read-out means are located respectively above and below the holder. In this state, the light, which is emitted from one surface side of the stimulable phosphor sheet when the stimulable phosphor sheet is exposed to the stimulating rays, is detected by the photoelectric read-out means located above the holder, and an image signal (a one surface side image signal) is thereby detected. Also, the light, which is emitted from the other surface side of the stimulable phosphor sheet when the stimulable phosphor sheet is exposed to the stimulating rays, is detected by the photoelectric read-out means located below the holder, and an image signal (an other surface side image signal) is thereby detected.

Thereafter, an addition operation is performed on the image signal components of the two image signals having been detected from the opposite surfaces of the stimulable phosphor sheet (i.e., the one surface side image signal and the other surface side image signal), which image signal components represent corresponding pixels on the one surface and the other surface of the stimulable phosphor sheet, and an addition image signal (a superposition image signal) is thereby obtained. With the addition operation, high frequency noise occurring at random in each of the one surface side image signal and the other surface side image signal can be smoothed. Also, since the emitted light is collected from the two surfaces of the stimulable phosphor sheet, the light collecting efficiency can be enhanced. As a result, a superposition image, which has good image quality with an enhanced signal-to-noise ratio, can be reproduced from the addition image signal.

Also, as techniques for obtaining radiation image information by utilizing stimulable phosphor sheets, or the like, subtraction processing (subtraction operation) techniques have heretofore been known. With the subtraction processing techniques, a plurality of radiation images are recorded under different conditions and are then read out to obtain a plurality of image signals. Thereafter, a subtraction operation is performed on the plurality of the image signals, and a subtraction image signal is thereby obtained. In this manner, a subtraction image corresponding to the difference between the plurality of the radiation images, i.e. a subtraction image in which only a pattern of a specific object part (hereinbelow referred to also as a pattern of a tissue, a structure, or the like) in the radiation images has been enhanced or extracted, is obtained. Basically, the subtraction processing techniques may be classified into a temporal (time difference) subtraction processing technique and an energy subtraction processing technique. The applicant proposed various energy subtraction processing techniques utilizing stimulable phosphor sheets in, for example, U.S. Pat. Nos. 4,855,598 and 4,896,037.

With the rapid advances made in network technology accompanying rapid advances made in communication technology and computer technology in recent years, for example, in the medical fields, there has arisen a tendency toward utilization of medical image networks, which act as image transfer systems. With the medical image networks, various image forming apparatuses, which are located in examination rooms of hospitals, or the like, and image output devices, such as image display devices and printers, which are located in consultation rooms, laboratories, and the like, are connected to each other through a network. In such cases, visible images to be used in making a diagnosis can be reproduced in the consultation rooms from image signals, which have been acquired with the image forming apparatuses located in the examination rooms.

In the image transfer systems utilizing the networks, and the like, in cases where an operation-processed image obtained from the operation processing, such as the addition operation or the subtraction operation, is to be outputted by an image output device, the operation-processed image signal, such as the addition image signal or the subtraction image signal, having been obtained from the operation processing has heretofore been transferred from an image forming apparatus to the image output device, and a visible image has heretofore been outputted by the image output device in accordance with the transferred image signal.

However, with the transfer technique described above, it is difficult to operate such that, after the image outputted by the image output device is confirmed, parameters for the operation processing, such as the addition operation or the subtraction operation, are altered, the operation processing is again performed with the altered parameters, and an image obtained from the operation processing performed with the altered parameters is again outputted by the image output device.

Therefore, such that the difficulty described above may be eliminated, it may be considered to employ a technique, wherein a plurality of image signals having been acquired with the image forming apparatus, i.e. the original image signals, are directly transferred from the image forming apparatus to the image output device, the operation processing, such as the addition operation or the subtraction operation described above, is performed in the image output device by utilizing the plurality of the transferred original image signals and in accordance with predetermined parameters, and a visible image is outputted in accordance with the operation-processed image signal obtained from the operation processing.

However, with the technique described above, wherein the plurality of the original image signals are transferred to the image output device, and the image output device performs the operation processing and outputs the operation-processed image, the problems described below occur. Specifically, no image is displayed, i.e. a displaying waiting state occurs, before the operation processing, such as the addition operation or the subtraction operation, is finished. In the displaying waiting state, a diagnosis with an image cannot be made. Therefore, an uncomfortable feeling is given to the user, and loss of time occurs.

SUMMARY OF THE INVENTION

The primary object of the present invention is to provide an image transfer and output method, wherein an image output waiting state does not occur in cases where a plurality of original image signals are transferred to an image output device such that parameters for operation processing, such as an addition operation or a subtraction operation, are capable of being altered on the side of the image output device, and such that an image obtained from the operation processing performed with the altered parameters is capable of being again outputted by the image output device.

Another object of the present invention is to provide an image transfer and output system for carrying out the image transfer and output method.

A further object of the present invention is to provide an image signal input terminal for use in the image transfer and output system.

A still further object of the present invention is to provide an image output terminal for use in the image transfer and output system.

An image transfer and output method in accordance with the present invention is characterized by transferring a certain original image signal, which is among a plurality of original image signals, to an image output device, and performing image outputting with the image output device in accordance with the certain original image signal before operation processing, such as an addition operation or a subtraction operation, is finished and an operation-processed image, such as a superposition image or a subtraction image, thus becomes capable of being outputted on the side of the image output device.

Specifically, the present invention provides an image transfer and output method, comprising the steps of:

i) feeding a plurality of original image signals representing radiation image information, which have been fed out from an image signal input apparatus, into an operation processing device, ii) performing predetermined operation processing on the plurality of the received original image signals in the operation processing device to obtain an operation-processed image signal, iii) transferring at least one original image signal, which is among the plurality of the original image signals, to an image output device, iv) performing image outputting with the image output device and in accordance with the one original image signal having been transferred, v) after the operation-processed image signal has been obtained from the predetermined operation processing, feeding the operation-processed image signal into the image output device, and vi) performing image outputting with the image output device and in accordance with the received operation-processed image signal.

The term "transfer" as used herein means the transmission (delivery) of an image signal from one device to a different device. As the means for the transfer, one of various techniques may be employed. The transfer means is not limited to the means utilizing the network described above and may be, for example, the means for transmitting an image signal via a recording medium, such as a CD-ROM or a MO. In cases where the means for transmitting an image signal via a recording medium, such as a CD-ROM or a MO, is employed, and, for example, an image signal is to be transferred from the image signal input apparatus to an operation processing and image output terminal, which comprises the operation processing device and the image output device combined with each other, the image signal input apparatus may be provided with means for storing an image signal on the recording medium, and the operation processing and image output terminal may be provided with means for reading the image signal from the recording medium.

In the image transfer and output method in accordance with the present invention, the image outputting, which is performed with the image output device and in accordance with the one original image signal having been transferred, may be conducted in the manner described below. Specifically, for example, in cases where the CR apparatus described above is employed as the image forming apparatus, and an addition operation is performed to display a superposition image, a stimulating ray irradiation surface side image should preferably be firstly displayed. The term "stimulating ray irradiation surface side image" as used herein means the image, which is obtained by detecting the light emitted from the sheet surface on the stimulating ray irradiation side in cases where the stimulating rays are irradiated from only one surface side of the stimulable phosphor sheet. In cases where an energy subtraction operation is performed to display an energy subtraction image, either one of a high energy image, which is recorded with radiation having a high energy level, and a low energy image, which is recorded with radiation having a low energy level, may be firstly displayed.

Also, in the image transfer and output method in accordance with the present invention, the plurality of the original image signals are fed into an operation processing device, and the predetermined operation processing is performed on the plurality of the received original image signals in the operation processing device. Specifically, in the operation processing device, it is sufficient for the operation processing to be performed on at least two original image signals among the plurality of the received original image signals, and all of the plurality of the received original image signals need not necessarily be utilized in the operation processing. For example, in cases where three original image signals are fed from the image signal input apparatus into the operation processing device, the operation processing device may perform an addition operation, or the like, on the two original image signals among the three received original image signals.

Further, the image signal input apparatus may also feed out an original image signal other than the plurality of the original image signals described above, which are fed into the operation processing device. For example, in cases where two original image signals are fed from the image signal input apparatus into the operation processing device, the image signal input apparatus may also feed out a third original image signal other than the two original image signals.

Furthermore, in the image transfer and output method in accordance with the present invention, after the operation-processed image signal has been obtained from the predetermined operation processing, the operation-processed image signal is fed into the image output device. Also, the image outputting is performed with the image output device and in accordance with the received operation-processed image signal. Specifically, after the operation processing has been performed, the image outputting is performed in accordance with the operation-processed image signal, which has been obtained from the operation processing. More specifically, the image outputting is firstly performed in accordance with a certain original image signal among the plurality of the original image signals described above. Thereafter, when the operation-processed image signal has been obtained and it becomes possible to perform the image outputting in accordance with the operation-processed image signal, the operation-processed image represented by the operation-processed image signal is outputted with the image output device. In such cases, it is only necessary that, after the operation processing is finished, at least the operation-processed image, such as a superposition image or a subtraction image, be displayed. Specifically, the original image, which has been displayed before the operation processing is finished, need not necessarily be replaced by the operation-processed image. For example, before the operation processing is finished, the original image may be displayed over the entire area of the display screen. After the operation processing is finished, the original image and the operation-processed image may be displayed respectively on halves of the display screen.

The image transfer and output method in accordance with the present invention may be modified such that, in cases where the operation processing device is located on the side of the image output device, the plurality of the original image signals are transferred to the operation processing device, and the operation processing is performed on the plurality of the transferred original image signals in the operation processing device.

The term "operation processing device being located on the side of an image output device" as used herein means that the operation processing device is located such that the operation-processed image signal, which is obtained from the operation processing device, is fed into the image output device without the transfer via a network, a recording medium, or the like, being performed. The operation processing device and the image output device may be combined into an integral body (i.e., an image output terminal provided with operation processing functions). Alternatively, the operation processing device and the image output device may be formed as two independent devices.

Also, the image transfer and output method in accordance with the present invention may be modified such that, in cases where the operation processing device is located on the side of the image signal input apparatus, the operation-processed image signal, which has been obtained from the operation processing device, is transferred to the image output device, and the image outputting is performed with the image output device and in accordance with the operation-processed image signal having been transferred.

The term "operation processing device being located on the side of an image signal input apparatus" as used herein means that the operation processing device is located such that the plurality of the original image signals having been fed out from the image signal input apparatus are fed into the operation processing device without the transfer via a network, a recording medium, or the like, being performed. The operation processing device and the image signal input apparatus may be combined into an integral body (i.e., an image signal input terminal provided with operation processing functions). Alternatively, the operation processing device and the image signal input apparatus may be formed as two independent devices.

In cases where the image signal input apparatus, the operation processing device, and the image output device are located in independent forms as in the cases where the apparatus and the devices are connected with one another through a network, one original image signal among the plurality of the original image signals is transferred to the image output device, the plurality of the original image signals are transferred to the operation processing device, the operation processing is performed with the operation processing device and in accordance with the plurality of the transferred original image signals, and the operation-processed image signal having been obtained from the operation processing is transferred to the image output device.

The present invention also provides an image transfer and output system, comprising:

i) an image signal input apparatus for feeding a plurality of original image signals representing radiation image information, ii) an operation processing device for performing predetermined operation processing on the plurality of the original image signals to obtain an operation-processed image signal, iii) an image output device for performing image outputting in accordance with a received original image signal, and iv) a transfer device for transferring an image signal, wherein the transfer device transfers at least one original image signal, which is among the plurality of the original image signals, to the image output device, and the image output device operates such that the image output device performs image outputting in accordance with the one original image signal having been transferred and such that, when the operation-processed image signal is received from the operation processing device, the image output device performs image outputting in accordance with the received operation-processed image signal.

The image transfer and output system in accordance with the present invention may be modified such that the operation processing device is located on the side of the image output device, the transfer device transfers the plurality of the original image signals to the operation processing device, and the operation processing device performs the operation processing on the plurality of the transferred original image signals.

Also, the image transfer and output system in accordance with the present invention may be modified such that the operation processing device is located on the side of the image signal input apparatus, and the transfer device transfers the operation-processed image signal, which has been obtained from the operation processing device, to the image output device.

The present invention further provides an image signal input terminal for use in the image transfer and output system in accordance with the present invention. Specifically, the present invention further provides an image signal input terminal, comprising:

i) an image signal input apparatus for feeding a plurality of original image signals representing radiation image information, and ii) an operation processing device for performing predetermined operation processing on the plurality of the original image signals to obtain an operation-processed image signal.

The present invention still further provides an image output terminal for use in the image transfer and output system in accordance with the present invention. Specifically, the present invention still further provides an image output terminal, comprising:

i) an operation processing device for performing predetermined operation processing on a plurality of original image signals to obtain an operation-processed image signal, and ii) an image output device for operating such that the image output device performs image outputting in accordance with one original image signal among the plurality of the original image signals and such that, when the operation-processed image signal is received from the operation processing device, the image output device performs image outputting in accordance with the received operation-processed image signal.

With the image transfer and output method and the image transfer and output system in accordance with the present invention, at least one original image signal, which is among the plurality of the original image signals, is transferred to the image output device, and the image outputting is performed with the image output device and in accordance with the one original image signal having been transferred. After the predetermined operation processing has been finished in the operation processing device, the operation-processed image, such as a superposition image or a subtraction image, is outputted with the image output device. Therefore, an image outputting waiting state does not occur before the operation-processed image is displayed. Accordingly, for example, before the operation-processed image is displayed, temporary processing, such as a preliminary diagnosis, can be performed by use of the original image. The feature is advantageous in practice.

Also, operation processing can again be performed by utilizing the plurality of the transferred original image signals, or by utilizing one transferred original image signal and the operation-processed image signal, and with altered parameters for the operation processing, such as the addition operation or the subtraction operation, and an image obtained from the operation processing performed with the altered parameters can again be outputted with the image output device.

DESCRIPTION OF THE PREFERRED EMBODIMENTS

The present invention will hereinbelow be described in further detail with reference to the accompanying drawings.

Figure 1:
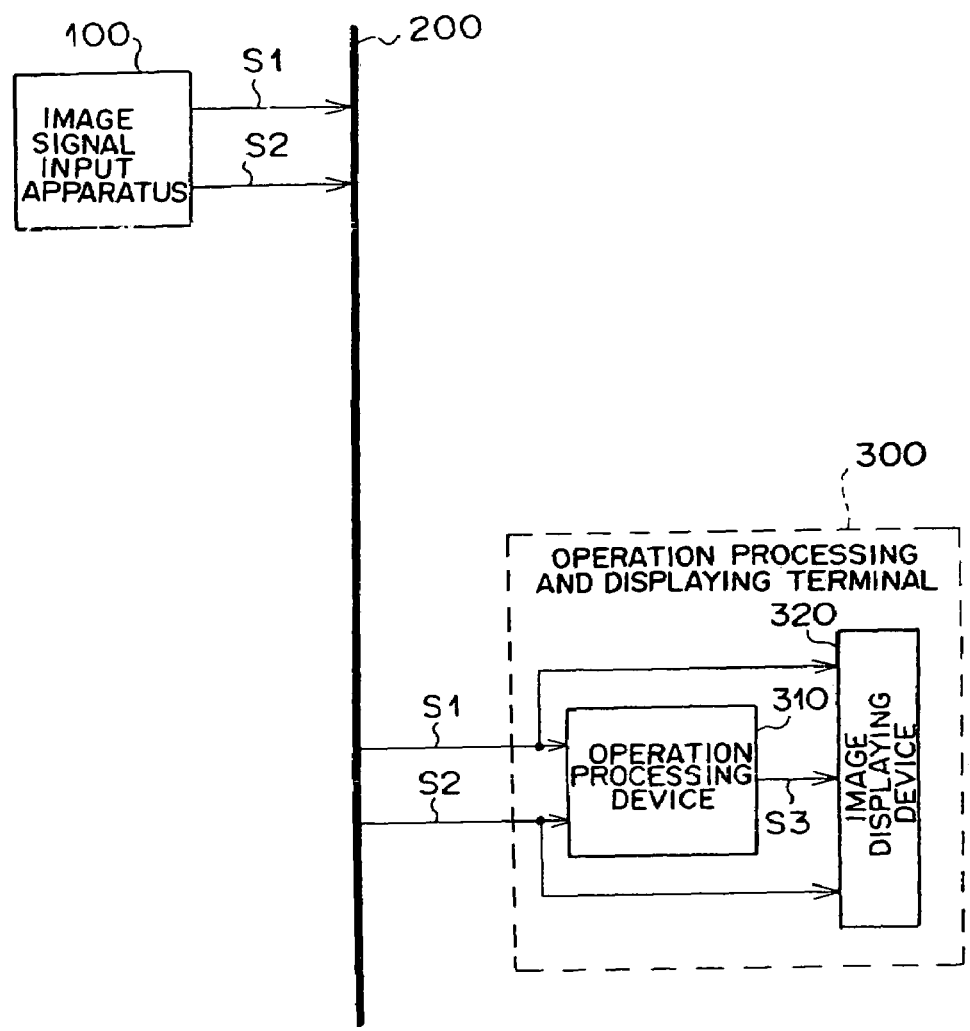
FIG. 1 is a block diagram showing a first embodiment of the image transfer and output system in accordance with the present invention.

FIG. 1 is a block diagram showing a first embodiment of the image transfer and output system in accordance with the present invention. As illustrated in FIG. 1, the first embodiment of the image transfer and output system in accordance with the present invention comprises an image signal input apparatus 100, and a network 200 acting as a transfer device. The image transfer and output system also comprises an operation processing and displaying terminal 300, which comprises an operation processing device 310 and an image displaying device 320 combined into an integral body and which acts as an image output terminal. The image displaying device 320 is constituted of a cathode ray tube (CRT) display device or a liquid crystal panel display device for outputting a soft copy. Alternatively, in the operation processing and displaying terminal 300, the operation processing device 310 and the image displaying device 320 may be formed as two independent devices. By way of example, the image transfer and output system can be utilized as a medical network system in a hospital.

As the image signal input apparatus 100, one of various apparatuses, which feeds a plurality of original image signals, may be employed. For example, as the image signal input apparatus 100, an image forming apparatus, such as a CT scanner or a CR apparatus, may be utilized.

Figure 2:
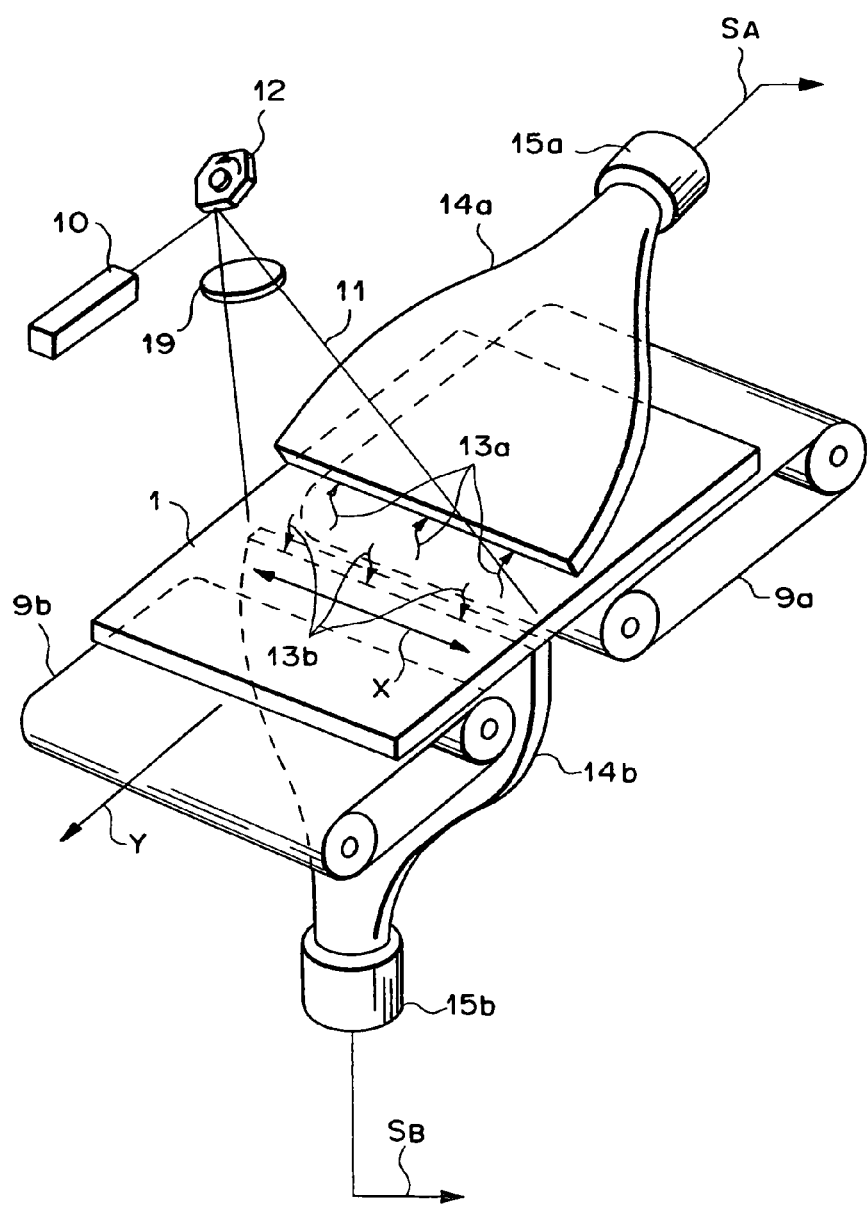
FIG. 2 is a perspective view showing an example of a radiation image read-out apparatus, which acts as an image signal input apparatus in the embodiment of the image transfer and output system and in which a technique for detecting light emitted from opposite surfaces of a stimulable phosphor sheet and thereby detecting two image signals from the opposite surfaces of the stimulable phosphor sheet is employed.

FIG. 2 is a perspective view showing an example of a radiation image read-out apparatus, which acts as the image signal input apparatus 100 and in which a technique for detecting light emitted from opposite surfaces of a stimulable phosphor sheet and thereby detecting two image signals from the opposite surfaces of the stimulable phosphor sheet is employed.

As illustrated in FIG. 2, in the radiation image read-out apparatus, a stimulable phosphor sheet 1, on which radiation image information has been stored, is placed on endless belts 9a and 9b, which are rotated by motors (not shown). A laser beam source 10, a rotating polygon mirror 12, and a scanning lens 19 are located above the stimulable phosphor sheet 1. The laser beam source 10 produces a laser beam 11 acting as stimulating rays, which cause the stimulable phosphor sheet 1 to emit light in proportion to the amount of energy stored thereon during its exposure to radiation. The rotating polygon mirror 12 reflects and deflects the laser beam 11 having been produced by the laser beam source 10 and causes the laser beam 11 to scan the stimulable phosphor sheet 1 in main scanning directions indicated by the double headed arrow X. The rotating polygon mirror 12 is rotated by a motor (not shown). The scanning lens 19 converges the laser beam 11, which has been reflected and deflected by the rotating polygon mirror 12, onto the stimulable phosphor sheet 1 and causes the laser beam 11 to scan the stimulable phosphor sheet 1 at uniform speed. A light guide member 14a is located above and close to the position that is scanned with the laser beam 11. The light guide member 14a guides the light, which is emitted by the stimulable phosphor sheet 1 when the stimulable phosphor sheet 1 is scanned with the laser beam 11, from above. Also, a light guide member 14b is located below the position that is scanned with the laser beam 11. The light guide member 14b is located perpendicularly to the stimulable phosphor sheet 1 and guides the emitted light from below. The light guide member 14a is connected to a photomultiplier 15a for photoelectrically detecting the emitted light. Also, the light guide member 14b is connected to a photomultiplier 15b for photoelectrically detecting the emitted light. The photomultiplier 15a and the photomultiplier 15b are connected to logarithmic amplifiers (not shown).

When radiation image signals are to be obtained with the radiation image read-out apparatus, the stimulable phosphor sheet 1, on which the radiation image information of an object has been stored, is set at a predetermined position on the endless belts 9a and 9b. The stimulable phosphor sheet 1, which has been set at the predetermined position, is conveyed in the direction (sub-scanning direction), which is indicated by the arrow Y, by the endless belts 9a and 9b. The laser beam 11, which has been produced by the laser beam source 10, is reflected and deflected by the rotating polygon mirror 12, which is being driven by the motor (not shown) and quickly rotated in the direction indicated by the arrow. The laser beam 11 is then converged by the scanning lens 19 onto the stimulable phosphor sheet 1 and is caused to scan the stimulable phosphor sheet 1 in the main scanning directions indicated by the double headed arrow X. The main scanning directions are approximately normal to the sub-scanning direction indicated by the arrow Y. When the stimulable phosphor sheet 1 is thus exposed to the laser beam 11, light in accordance with the stored radiation image information is emitted by the exposed portion of the stimulable phosphor sheet 1. Specifically, light 13a is emitted from the upper surface side of the stimulable phosphor sheet 1, and light 13b is emitted from the lower surface side of the stimulable phosphor sheet 1.

The light 13a, which has been emitted from the upper surface side of the stimulable phosphor sheet 1 impinges upon a light input face of the light guide member 14a. The emitted light 13a enters the light guide member 14a from its light input face and is guided through repeated total reflection inside of the light guide member 14a. The emitted light 13a then emanates from a light output face of the light guide member 14a and is received by the photomultiplier 15a. In this manner, the emitted light 13a is converted by the photomultiplier 15a into an analog electric signal $S_A$, which is in accordance with the amount of the emitted light 13a, which amount represents the stored radiation image information. In the same manner as that described above, the emitted light 13b, which has been emitted from the lower surface side of the stimulable phosphor sheet 1, is guided inside of the light guide member 14b and is photoelectrically detected by the photomultiplier 15b. The emitted light 13b is converted by the photomultiplier 15b into an analog electric signal $S_B$. In this manner, two electric signals $S_A$ and $S_B$ representing the radiation image information are obtained.

The electric signal $S_A$, which has been generated by the photomultiplier 15a, and the electric signal $S_B$, which has been generated by the photomultiplier 15b, are fed into logarithmic amplifiers (not shown) and are then fed into image processing means (not shown). Ultimately, the electric signal $S_A$ is converted into an image signal S1, and the electric signal $S_B$ is converted into an image signal S2. The image signal S1, which has been obtained by detecting the light 13a emitted from the upper surface side of the stimulable phosphor sheet 1, will hereinbelow be referred to as the stimulating ray irradiation surface side image signal S1. Also, the image signal S2, which has been obtained by detecting the light 13b emitted from the lower surface side of the stimulable phosphor sheet 1, will hereinbelow be referred to as the other surface side image signal S2. An addition operation may be performed on the stimulating ray irradiation surface side image signal S1 and the other surface side image signal S2, and an addition image signal S3 may thereby be obtained as the operation-processed image signal.

In a conventional image transfer and output system, the thus obtained addition image signal S3 is fed to the network 200. Also, in the conventional image transfer and output system, the addition image signal S3 is transferred and fed into the image displaying device 320, and the superposition image represented by the addition image signal S3 is outputted with the image displaying device 320.

In the first embodiment of the image transfer and output system in accordance with the present invention, the operation processing device 310 for forming the addition image signal S3 is located on the side of the image displaying device 320, and the operation processing device 310 and the image displaying device 320 are combined into an integral body to constitute the operation processing and displaying terminal 300. Also, the addition image signal S3 is not fed to the network 200, and the stimulating ray irradiation surface side image signal S1 and the other surface side image signal S2 are fed to the network 200 and transferred through the network 200 to the operation processing device 310. In the operation processing device 310, the addition operation is performed on the thus transferred image signals S1 and S2. Thereafter, the superposition image represented by the addition image signal S3 obtained from the addition operation is outputted with the image displaying device 320. The features described above will hereinbelow be described in more detail.

The stimulating ray irradiation surface side image signal S1 and the other surface side image signal S2, which have been fed from the image signal input apparatus 100, are transferred through the network 200 to the operation processing and displaying terminal 300. In such cases, operation parameters for the addition operation may be appended to the stimulating ray irradiation surface side image signal S1 and the other surface side image signal S2 and may thus be transferred to the operation processing and displaying terminal 300.

As described above, the operation processing and displaying terminal 300 receives the stimulating ray irradiation surface side image signal S1 and the other surface side image signal S2. In the operation processing and displaying terminal 300, firstly, the stimulating ray irradiation surface side image, which is represented by the stimulating ray irradiation surface side image signal S1, is displayed on the image displaying device 320. At this time, a predetermined mark should preferably be displayed in order to indicate that the displayed image is the one (i.e., the stimulating ray irradiation surface side image) before being subjected to the operation processing, which will be described later.

Simultaneously with the displaying of the stimulating ray irradiation surface side image, the operation processing device 310 performs the addition operation on the stimulating ray irradiation surface side image signal S1 and the other surface side image signal S2 and forms the addition image signal S3, which represents the superposition image.

Figure 3:
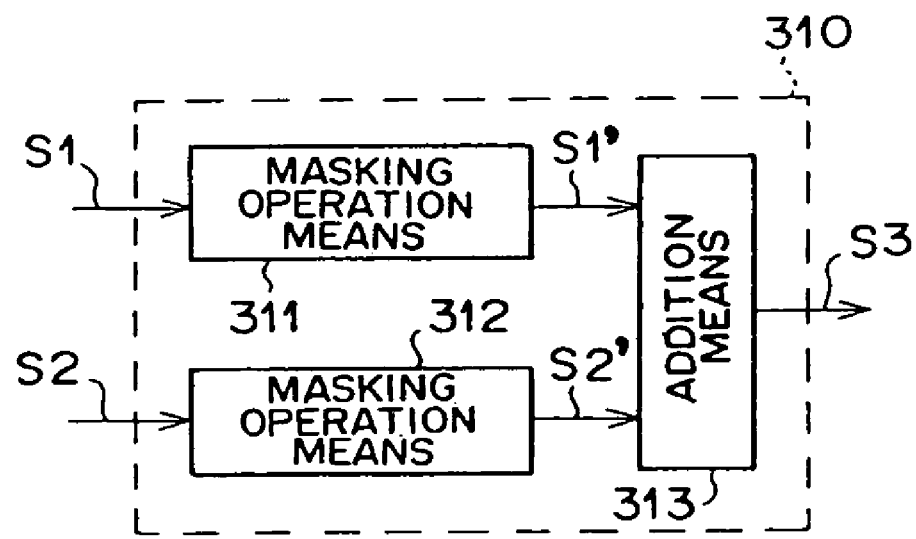
FIG. 3 is a block diagram showing operation processing means in an operation processing and displaying terminal, which is employed in the embodiment of the image transfer and output system.

As illustrated in FIG. 3, the operation processing device 310 comprises masking operation means 311 for performing a masking operation on the stimulating ray irradiation surface side image signal S1, and masking operation means 312 for performing a masking operation on the other surface side image signal S2. The operation processing means 310 also comprises addition means 313 for performing the addition operation on a stimulating ray irradiation surface side image signal S1', which has been obtained from the masking operation, and an other surface side image signal S2', which has been obtained from the masking operation. In this manner, the addition operation is performed on the image signals having been obtained from the filtering processing with the masking operations.

As the filtering processing with the masking operations, one of various known filtering processing techniques may be employed. For example, a processing technique for performing wavelet transform on an image signal to obtain wavelet transform factor signals of different frequency bands may be employed. The processing technique for performing the wavelet transform is disclosed in, for example, Japanese Unexamined Patent Publication No. 7(1995)-319092. In cases where the processing technique disclosed in Japanese Unexamined Patent Publication No. 7(1995)-319092 is employed, in the addition means 313, the addition operation may be performed with weight factors appropriate for each of the stimulating ray irradiation surface side and the other surface side and with respect to each of the frequency bands.

After the addition image signal S3 has been formed by the operation processing device 310 and has been fed into the image displaying device 320, the image displaying device 320 performs the image displaying in accordance with the addition image signal S3. For example, the image displaying device 320 displays the superposition image, which is represented by the addition image signal S3, in lieu of the stimulating ray irradiation surface side image. Alternatively, the stimulating ray irradiation surface side image may be displayed at the left half of the display screen of the image displaying device 320, and the superposition image may be displayed at the right half of the display screen of the image displaying device 320.

As described above, with the first embodiment of the image transfer and output system in accordance with the present invention and the operation processing and displaying terminal employed in it, before the addition operation is finished on the side of the operation processing and displaying terminal 300 and the superposition image thus becomes capable of being displayed, the stimulating ray irradiation surface side image (the original image), which is represented by the stimulating ray irradiation surface side image signal S1 transferred from the image signal input apparatus 100, is displayed by the operation processing and displaying terminal 300. Therefore, a displaying waiting state does not occur before the superposition image is displayed. Accordingly, before the superposition image is displayed, temporary processing, such as a preliminary diagnosis, can be performed by use of the displayed stimulating ray irradiation surface side image. Also, the addition operation can again be performed on the plurality of the transferred original image signals and with altered parameters for the addition operation on the side of the operation processing and displaying terminal 300, and a superposition image obtained from the addition operation performed with the altered parameters can again be outputted by the operation processing and displaying terminal 300. The features are advantageous in practice.

In the embodiment described above, before the addition operation is finished on the side of the operation processing and displaying terminal 300 and the superposition image thus becomes capable of being displayed, the stimulating ray irradiation surface side image is displayed by the operation processing and displaying terminal 300. Alternatively, in lieu of the stimulating ray irradiation surface side image, the other surface side image may be displayed before the addition operation is finished.

Also, in the first embodiment described above, the radiation image read-out apparatus, in which the technique for detecting light emitted from opposite surfaces of a stimulable phosphor sheet and thereby detecting two image signals from the opposite surfaces of the stimulable phosphor sheet is employed, is employed as the image signal input apparatus 100. Also, the operation processing device 310 performs the addition operation. However, the image transfer and output system in accordance with the present invention is not limited to the embodiment described above.

For example, as the image signal input apparatus 100, an apparatus capable of acquiring a high energy image signal, which represents a high energy image having been recorded with radiation having a high energy level, and a low energy image signal, which represents a low energy image having been recorded with radiation having a low energy level, for energy subtraction processing may be employed. Also, as the operation processing device 310, a device for performing a subtraction operation may be employed. In this manner, before the subtraction operation is finished on the side of the operation processing and displaying terminal 300 and an energy subtraction image having been obtained from the subtraction operation thus becomes capable of being displayed, the high energy image, which is represented by the high energy image signal transferred from the image signal input apparatus 100, or the low energy image, which is represented by the low energy image signal transferred from the image signal input apparatus 100, may be displayed by the operation processing and displaying terminal 300. After the subtraction operation is finished, the energy subtraction image, which has been obtained from the subtraction operation, may be displayed by the operation processing and displaying terminal 300.

Figure 4:
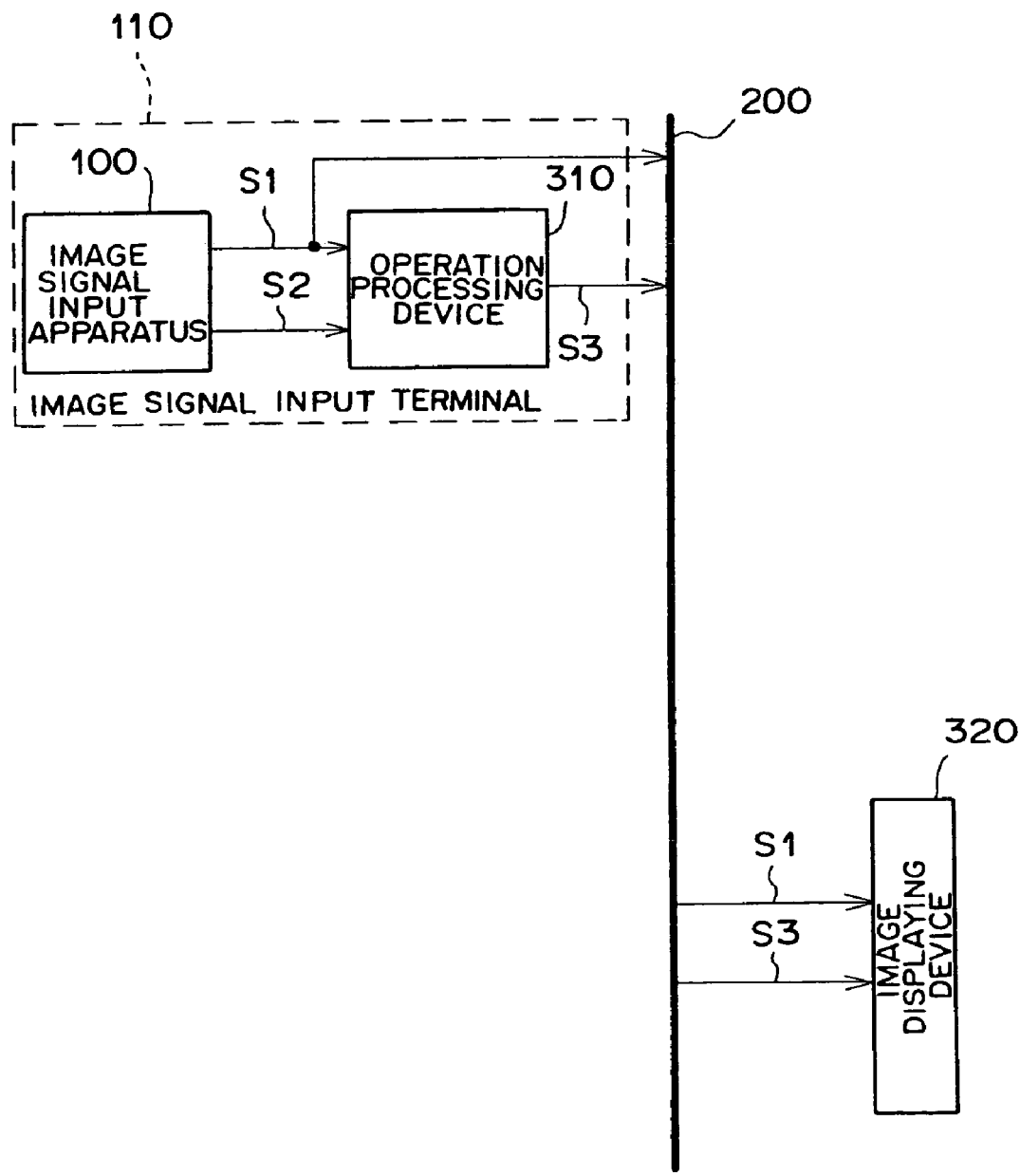
FIG. 4 is a block diagram showing a second embodiment of the image transfer and output system in accordance with the present invention.

A second embodiment of the image transfer and output system in accordance with the present invention will be described hereinbelow. FIG. 4 is a block diagram showing a second embodiment of the image transfer and output system in accordance with the present invention.

In the first embodiment of the image transfer and output system described above, the operation processing device 310 is located on the side of the image displaying device 320. In the second embodiment of the image transfer and output system in accordance with the present invention, the operation processing device 310 for obtaining the addition image signal S3 is located on the side of the image signal input apparatus 100, and an image signal input terminal 110 is constituted, in which the image signal input apparatus 100 and the operation processing device 310 are combined with each other into an integral body. Also, the addition image signal S3 and the stimulating ray irradiation surface side image signal S1 are fed into the network 200 and transferred through the network 200. In this manner, the stimulating ray irradiation surface side image, which is represented by the stimulating ray irradiation surface side image signal S1 having been transferred, or the superposition image, which is represented by the addition image signal S3 having been transferred, is outputted with the image displaying device 320. Alternatively, the image signal input apparatus 100 and the operation processing device 310 may be formed as two independent apparatus and device. Basically, the second embodiment operates in the same manner as that in the first embodiment described above, except for the features described below.

Specifically, of the stimulating ray irradiation surface side image signal S1 and the other surface side image signal S2, which have been fed from the image signal input apparatus 100, the stimulating ray irradiation surface side image signal S1 is transferred through the network 200 to the image displaying device 320. In the image displaying device 320, firstly, the stimulating ray irradiation surface side image, which is represented by the stimulating ray irradiation surface side image signal S1, is displayed. At this time, as in the first embodiment described above, a predetermined mark should preferably be displayed in order to indicate that the displayed image is the stimulating ray irradiation surface side image.

Simultaneously with the displaying of the stimulating ray irradiation surface side image, the stimulating ray irradiation surface side image signal S1 and the other surface side image signal S2, which have been fed from the image signal input apparatus 100, are immediately fed into the operation processing device 310, and the addition image signal S3 is formed.

After the addition image signal S3 has been formed by the operation processing device 310, the addition image signal S3 is transferred through the network 200 to the image displaying device 320.

When the addition image signal S3 is transferred from the operation processing device 310 to the image displaying device 320, the image displaying device 320 performs the image displaying in accordance with the addition image signal S3. For example, the image displaying device 320 displays the superposition image, which is represented by the addition image signal S3, in lieu of the stimulating ray irradiation surface side image. Alternatively, the stimulating ray irradiation surface side image may be displayed at the left half of the display screen of the image displaying device 320, and the superposition image may be displayed at the right half of the display screen of the image displaying device 320.

As described above, with the second embodiment of the image transfer and output system in accordance with the present invention and the image signal input terminal employed in it, before the addition operation is finished in the operation processing device 310 and the addition image signal S3 representing the superposition image becomes capable of being transferred to the image displaying device 320, the stimulating ray irradiation surface side image (the original image signal), which is represented by the stimulating ray irradiation surface side image signal S1 having been transferred from the image signal input apparatus 100, is displayed on the image displaying device 320. Therefore, as in the first embodiment described above, a displaying waiting state does not occur before the superposition image is displayed.

Also, the other surface side image signal S2 can be reconstructed from the stimulating ray irradiation surface side image signal S1 and the addition image signal S3, which have been transferred. Further, by the utilization of the stimulating ray irradiation surface side image signal S1, which has been transferred, and the other surface side image signal S2, which has thus been reconstructed, the parameters for the addition operation can be altered, and the addition operation can again be performed with the altered parameters for the addition operation. In this manner, a superposition image obtained from the addition operation performed with the altered parameters can again be outputted.

In the second embodiment, as in the first embodiment described above, the other surface side image may be firstly displayed in lieu of the stimulating ray irradiation surface side image. Also, an energy subtraction image may be displayed in lieu of the superposition image.

Figure 5:
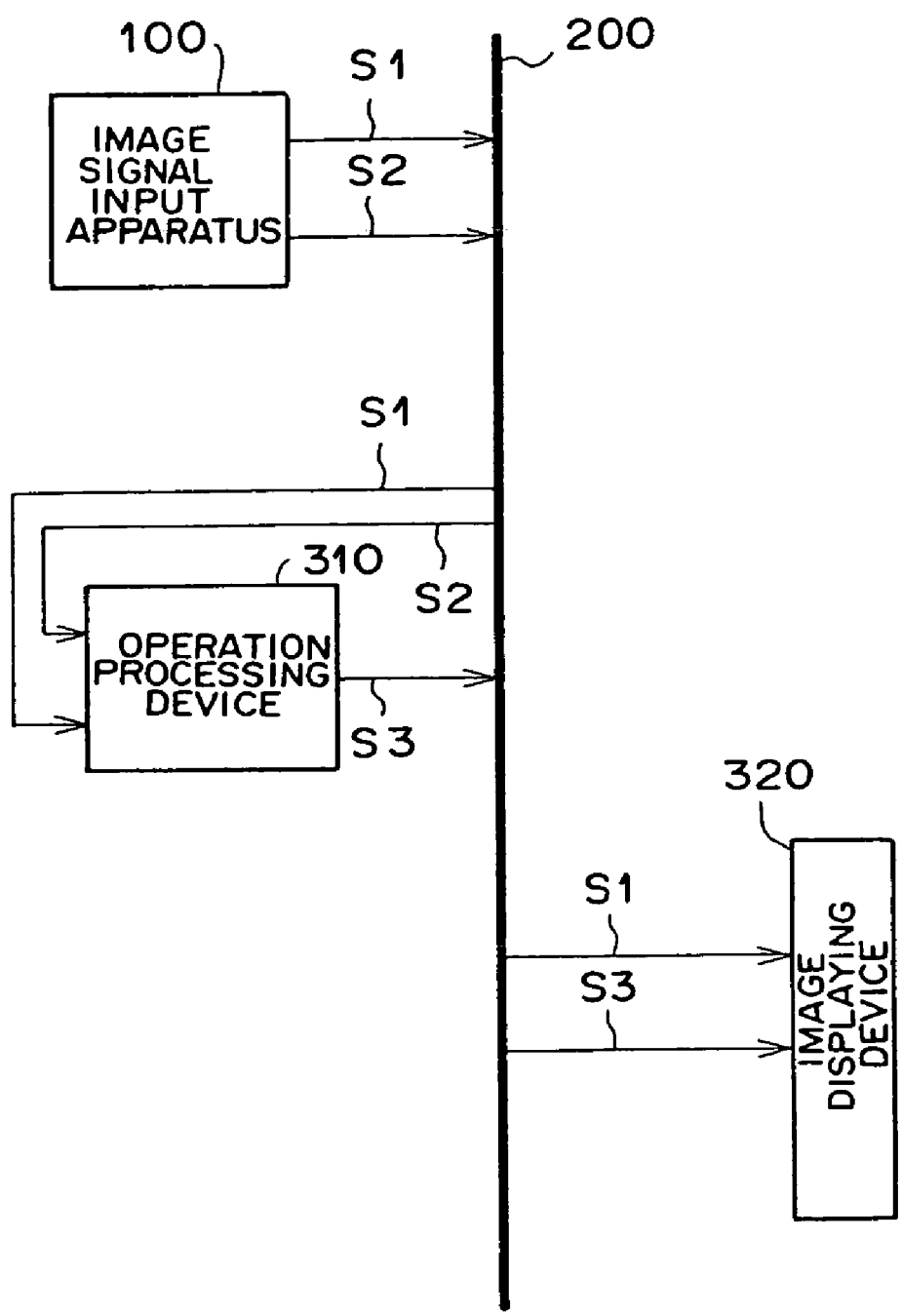
FIG. 5 is a block diagram showing a third embodiment of the image transfer and output system in accordance with the present invention.

A third embodiment of the image transfer and output system in accordance with the present invention will be described hereinbelow. FIG. 5 is a block diagram showing a third embodiment of the image transfer and output system in accordance with the present invention.

With reference to FIG. 5, in the third embodiment of the image transfer and output system in accordance with the present invention, the image signal input apparatus 100, the operation processing device 310, and the image displaying device 320 are connected with one another through the network 200. Also, the stimulating ray irradiation surface side image signal S1 and the other surface side image signal S2 are fed to the network 200 and transferred through the network 200. The stimulating ray irradiation surface side image signal S1 is fed into the image displaying device 320. Further, the stimulating ray irradiation surface side image signal S1 and the other surface side image signal S2 are fed into the operation processing device 310. The addition image signal S3, which has been obtained from the addition operation performed by the operation processing device 310, is transferred through the network 200 and fed into the image displaying device 320. In this manner, the stimulating ray irradiation surface side image or the superposition image is outputted. Basically, the third embodiment operates in the same manner as that in the first and second embodiments described above, except for the features described below.

Specifically, the stimulating ray irradiation surface side image signal S1 and the other surface side image signal S2, which have been fed from the image signal input apparatus 100, are fed to and transferred through the network 200. The image displaying device 320 receives the stimulating ray irradiation surface side image signal S1 and the other surface side image signal S2, which have thus been transferred. In the image displaying device 320, firstly, the stimulating ray irradiation surface side image, which is represented by the stimulating ray irradiation surface side image signal S1, is displayed. At this time, as in the first and second embodiments described above, a predetermined mark should preferably be displayed in order to indicate that the displayed image is the stimulating ray irradiation surface side image.

Simultaneously with the displaying of the stimulating ray irradiation surface side image, the stimulating ray irradiation surface side image signal S1 and the other surface side image signal S2, which have been fed from the image signal input apparatus 100, are fed through the network 200 into the operation processing device 310, and the addition image signal S3 is formed.

After the addition image signal S3 has been formed by the operation processing device 310, the addition image signal S3 is transferred through the network 200 to the image displaying device 320.

When the addition image signal S3 is transferred from the operation processing device 310 to the image displaying device 320, the image displaying device 320 performs the image displaying in accordance with the addition image signal S3. For example, the image displaying device 320 displays the superposition image, which is represented by the addition image signal S3, in lieu of the stimulating ray irradiation surface side image. Alternatively, the stimulating ray irradiation surface side image may be displayed at the left half of the display screen of the image displaying device 320, and the superposition image may be displayed at the right half of the display screen of the image displaying device 320.

As described above, with the third embodiment of the image transfer and output system in accordance with the present invention, before the addition operation is finished in the operation processing device 310 and the addition image signal S3 representing the superposition image becomes capable of being transferred to the image displaying device 320, the stimulating ray irradiation surface side image (the original image signal), which is represented by the stimulating ray irradiation surface side image signal S1 having been transferred from the image signal input apparatus 100 to the image displaying device 320, is displayed on the image displaying device 320. Therefore, as in the first and second embodiments described above, a displaying waiting state does not occur before the superposition image is displayed.

Also, as in the second embodiment described above, the other surface side image signal S2 can be reconstructed from the stimulating ray irradiation surface side image signal S1 and the addition image signal S3, which have been transferred. Further, by the utilization of the stimulating ray irradiation surface side image signal S1, which has been transferred, and the other surface side image signal S2, which has thus been reconstructed, the parameters for the addition operation can be altered, and the addition operation can again be performed with the altered parameters for the addition operation. In this manner, a superposition image obtained from the addition operation performed with the altered parameters can again be outputted.

In the third embodiment, as in the first embodiment described above, the other surface side image may be firstly displayed in lieu of the stimulating ray irradiation surface side image. Also, an energy subtraction image may be displayed in lieu of the superposition image.

The image transfer and output system in accordance with the present invention is not limited to the embodiments described above and may be embodied in various other ways.

For example, in the embodiments described above, the image displaying device 320 for outputting a soft copy, such as a CRT display device or a liquid crystal panel display device, is employed as the image output device. Alternatively, for example, a device for outputting a hard copy, such as a laser printer, may be employed as the image output device. In such cases, before an operation-processed image (such as a superposition image or an energy subtraction image), which is to be obtained ultimately, becomes capable of being outputted with the laser printer, the stimulating ray irradiation surface side image or the other surface side image may be outputted with the laser printer. Alternatively, besides the laser printer, an image displaying device, such as a CRT display device, may be utilized. In this manner, the stimulating ray irradiation surface side image or the other surface side image may be displayed on the image displaying device. The outputting of a single hard copy image requires a longer time than the outputting of a soft copy image. However, in cases where the image displaying device, such as a CRT display device, is utilized besides the laser printer, the stimulating ray irradiation surface side image, or the like, can be displayed on the CRT display device before the entire area of the superposition image is outputted with the printer. Therefore, in such cases, preliminary confirmation of the image can be made by seeing the image displayed on the CRT display device.

In addition, all of the contents of Japanese Patent Application Nos. 11(1999)-185350 and 2000-178384 are incorporated into this specification by reference.

What is claimed is:

1. An image transfer and output method, comprising the steps of:
   i) feeding a plurality of original image signals representing radiation image information, which have been fed out from an image signal input apparatus, into an operation processing device,
   ii) performing predetermined operation processing on the plurality of the received original image signals in the operation processing device to obtain an operation-processed image signal,
   iii) transferring at least one original image signal, which is among the plurality of the original image signals, to an image output device, prior to the operation-processed image signal being obtained from the predetermined operation processing,
   iv) performing image outputting with the image output device and in accordance with the one original image signal having been transferred,
   v) after the operation-processed image signal has been obtained from the predetermined operation processing, feeding the operation-processed image signal into the image output device, and
   vi) performing image outputting with the image output device and in accordance with the received operation-processed image signal.

2. A method as defined in claim 1 wherein, in cases where the operation processing device is located on the side of the image output device, the plurality of the original image signals are transferred to the operation processing device, and the operation processing is performed on the plurality of the transferred original image signals in the operation processing device.

3. The method of claim 2, wherein the plurality of original image signals are transferred to the operation processing device from the image signal input apparatus through a network.

4. A method as defined in claim 1 wherein, in cases where the operation processing device is located on the side of the image signal input apparatus, the operation-processed image signal, which has been obtained from the operation processing device, is transferred to the image output device, and the image outputting is performed with the image output device and in accordance with the operation-processed image signal having been transferred.

5. A method as defined in claim 1, wherein performing image outputting with the image output device and in accordance with the one original image signal having been transferred is performed prior to the operation-processed image signal being obtained from the predetermined operation processing.

6. A method as defined in claim 1, wherein the step ii) comprises adding an image signal obtained from an upper surface side of a stimulable phosphor sheet to an image signal obtained from a lower surface side of the stimulable phosphor sheet.

7. A method as defined in claim 6, wherein the step ii) further comprises performing a masking operation on each of the image signals obtained from the upper and lower surface sides of the stimulable phosphor sheet.

8. A method as defined in claim 1, wherein, in said step vi, an image represented by the received operation-processed image signal is displayed on the image output device together with an image represented by said one original image signal.

9. A method as defined in claim 1, wherein first and second original image signals are output in parallel from said image signal input apparatus.

10. An image transfer and output method, comprising:

i) feeding a plurality of original image signals representing radiation image information, which have been fed out from an image signal input apparatus, into an operation processing device, ii) performing predetermined operation processing on the plurality of the received original image signals in the operation processing device to obtain an operation-processed image signal which represent the radiation image information, iii) feeding the operation-processed image signal into an image output device, iv) performing image outputting with the image output device and in accordance with the received operation-processed image signal, wherein v) at least one of said plurality of original image signals is transferred to the image output device, before the operation-processed image signals is obtained from the predetermined operation-processing, and vi) image outputting is performed with the image output device and in accordance with said at least one original image signal having been transferred, before the operation-processed image signal has been obtained and image outputting has been capable of being performed with the image output device and in accordance with said obtained operation-processed image signal.

11. A method as defined in claim 10, wherein the plurality of the original image signals comprise a high energy image signal, which represents a high energy image having been recorded with radiation having a high energy level, and a low energy image signal, which represents a low energy image having been recorded with radiation having a low energy level, for energy subtraction processing, and the operation-processed image signal represents an energy subtraction image.

* * * * *